United States Patent Office 3,485,829
Patented Dec. 23, 1969

3,485,829
CYCLOBUTANO- AND CYCLOBUTENO-(3',4':6,7) DERIVATIVES OF THE ANDROSTANE AND 19-NOR-ANDROSTANE SERIES
John H. Fried, Palo Alto, Calif., assignor to Syntex Corporation, Panama, Panama, a corporation of Panama
No Drawing. Continuation-in-part of application Ser. No. 544,679, Apr. 25, 1966. This application Apr. 10, 1967, Ser. No. 629,418
Int. Cl. C07c 173/00, 169/24, 167/06
U.S. Cl. 260—239.55       15 Claims

ABSTRACT OF THE DISCLOSURE

Cyclobutano-(3',4':6,7) derivatives of the androstane and 19-nor-androstane series, useful as pharmacological agents, are prepared by the photochemical cycloaddition of maleic anhydride, dimethylmaleic anhydride or difluoromaleic anhydride to a 3-keto-$\Delta^{4,6}$-diene of the androstane or 19-nor-androstane series. Subsequently, these derivatives are hydrolyzed under basic conditions to the free acid adducts which can be esterified or oxidatively decarboxylated to a corresponding cyclobuteno-(3',4':6,7) derivative.

---

This is a continuation-in-part of application, Ser. No. 544,679, filed Apr. 25, 1966, now abandoned.

The present invention relates to novel cyclobutano- and cyclobuteno-(3',4':6,7) derivatives of the androstane and 19-nor-androstane series and to methods for the preparation thereof.

More specifically, the present invention relates to novel compounds represented by the following formulas:

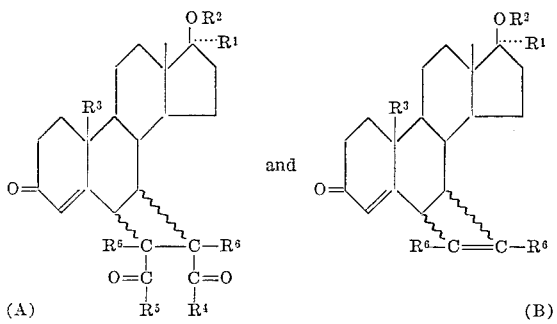

wherein $R^1$ is hydrogen, lower alkyl, lower alkenyl, low alkynyl or lower haloalkynyl;
$R^2$ is hydrogen, tetrahydropyran-2'-yl or a hydrocarbon carboxylic acyl group of less than 12 carbon atoms;
$R^3$ is hydrogen or methyl;
$R^4$ and $R^5$ are each hydroxy or lower alkoxy or together is oxy; and
$R^6$ is hydrogen, methyl or fluoro.

The wavy line "ξ" at C-6 and C-7 indicates both alpha and beta configurations for the cyclobutano-(3',4':6,7) and cyclobuteno-(3',4':6,7) derivatives of the present invention, i.e., the cyclobutano-(3',4':6α,7α), the cyclobutano-(3',4':6β,7β), the cyclobuteno-(3',4':6α,7α), and the cyclobuteno-(3',4':6β,7β) derivatives of the androstane and 19-nor-androstane series.

The hydrocarbon carboxylic acyl groups of the compounds of the present invention contain less than 12 carbon atoms and are of a straight, branched, cyclic or cyclic-aliphatic chain structure. This structure is saturated, unsaturated or aromatic and optionally substituted by functional groups such as hydroxy, ethoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, dichloroacetate, and the like.

The term "lower alkyl," as used herein, refers to a straight or branched chain hydrocarbon group containing up to 6 carbon atoms and thus includes methyl, ethyl, n-butyl, and the like. The term "lower alkenyl" refers to a mono-ethylenically unsaturated straight or branched chain hydrocarbon group containing from 2 to 6 carbon atoms; it thus includes vinyl, allyl and the like. The term "lower alkynyl" refers to a straight or branched chain hydrocarbon group having from 2 to 6 carbon atoms and containing one carbon-carbon triple bond; it thus includes ethynyl, propargyl and the like. The term "lower haloalkynyl" refers to an alkynyl group as defined above which contains one halo substituent, the halo substituent having an atomic number of less than 53; it thus includes chloroethynyl, bromethynyl, fluoroethynyl and the like. The term "lower alkoxy," as used herein, refers to the group —OR wherein R is a straight or branched chain alkyl group of up to 6 carbon atoms. Typical lower alkoxy groups thus include methoxy, ethoxy, butoxy, isopropoxy, amyloxy, or the like. The term "dicarbonyloxy" refers to the anhydride grouping

this grouping being attached to C-1' and C-2' of the cyclobutano moiety.

The novel compounds of the present invention possess valuable pharmacological properties. The compounds of the present invention wherein $R^1$ is hydrogen, lower alkyl such as methyl, ethyl and the like, or lower alkenyl such as vinyl and the like, are valuable anabolic/androgenic agents having a favorable anabolic/androgenic ratio. The compounds of the present invention wherein $R^1$ is lower alkenyl such as vinyl, lower alkynyl such as ethynyl or haloalkynyl are valuable pituitary inhibiting and progestational agents and are useful in the treatment of various menstrual disorders and in the control and regulation of fertility. In addition, the novel compounds also possess anti-estrogenic activity. These compounds can be administered via usual routes in pharmaceutically acceptable compositions and at dosage rates of from 0.5γ to 5 mg./kg./day. However, dosage rates below or above this range can also be used, the most favorable dosage range being conditioned upon the purpose for which it is administered and the response thereto.

The novel compounds of the present invention are prepared in accordance with the following reaction sequence:

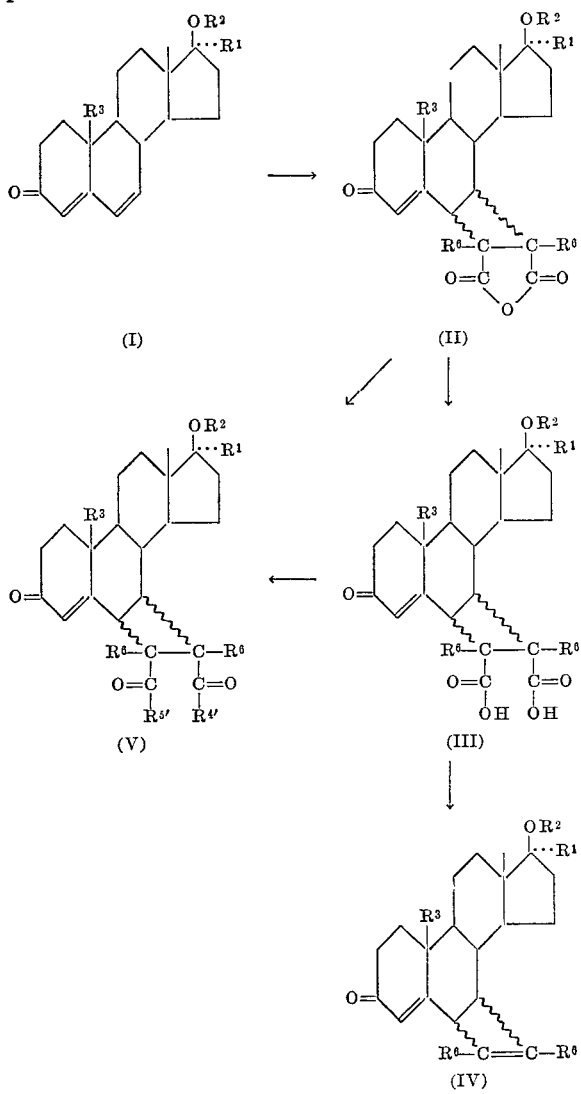

wherein $R^{4'}$ and $R^{5'}$ are each lower alkoxy and all other substituents are as defined hereinabove.

In the practice of the above outlined reaction sequence, the starting material of Formula I, i.e., an unsubstituted or appropriately substituted 3-keto-$\Delta^{4,6}$-diene, and an anhydride of the Formula VI:

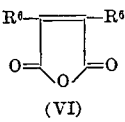

(VI)

wherein $R^6$ is as previously defined, are irradiated with ultraviolet light in an inert organic solvent such as benzene, dioxane, and the like or mixtures thereof, to effect the photochemical cycloaddition of the anhydride and thereby afford a cyclobutano-(3',4':6,7) cycloaddition product as shown by Formula II. A preferred choice for the cycloaddition reaction employs benzene as the inert organic solvent and ultraviolet light of a wavelength of about 270 to about 330 m$\mu$. The photochemical reaction is preferably performed at room temperature for from about 15 minutes to about 12 hours, three hours being generally sufficient.

Any suitable source of ultraviolet irradiation of a wavelength of about 270 to about 330 m$\mu$ can be employed for the photochemical cycloaddition reaction. Among these sources are commercially available high pressure mercury vapor lamps such as a 70 watt Hanau lamp, a 200 watt Hanovia lamp, and the like.

Under the above conditions, the photochemical cycloaddition of the anhydride occurs at the 4,5- and 6,7-double bonds to afford a mixture of the 4,5-cyclobutano and 6,7-cyclobutano adducts, the 6,7-cyclobutano adducts are generally the major products. The orientation of the resulting 4,5-cyclobutano adduct with respect to the steroid nucleus is predominately alpha. The orientation of the resulting 6,7-cyclobutano adducts with respect to the steroid nucleus is both alpha and beta, i.e., the adducts having the 6$\alpha$,7$\alpha$- and 6$\beta$,7$\beta$-configurations. The mixture of products can be separated at this point by conventional techniques such as by fractional crystallization from benzene:ether, and the like. Alternatively, the mixture of the 4,5-, 6$\alpha$,7$\alpha$- and 6$\beta$,7$\beta$-cyclobutano adducts is used in the next step and then the isomers are separated at a later stage as indicated below.

Subsequent to the photochemical cycloaddition, the mixture of cycloaddition products, i.e. the 4,5- adduct and the 6,7-adducts are hydrolyzed under basic conditions and subsequently acidified to yield a mixture of the corresponding cyclobutano adducts containing free carboxylic acid groups at the C–1' and C–2' positions of the cyclobutano moiety (Formula III). Basic conditions such as an alkali metal bicarbonate or carbonate in an aqueous solution of a low molecular weight monohydric alcohol, dioxane, tetrahydrofuran and the like, at a temperature of from about room temperature to the reflux temperature of the reaction medium for a period of about ½ to about three hours can be employed to carry out the hydrolysis. Preferably, the hydrolysis is carried out by treatment with sodium bicarbonate in aqueous dioxane at room temperature for about one hour followed by acidification of the reaction mixture with an inorganic or organic acid, preferably an inorganic acid such as hydrochloric acid, and the like.

This mixture containing the 4,5-, 6$\alpha$,7$\alpha$- and 6$\beta$,7$\beta$-cyclobutano adducts, containing free carboxylic acid groups at the C–1' and C–2' positions of the cyclobutano moiety, is preferably separated at this point by conventional techniques such as by chromatography on a silica gel column eluting with ethyl acetate:hexane containing a trace, e.g., about 0.5% by volume, of 98% formic acid to afford the novel cyclobutano-(3',4':6$\alpha$,7$\alpha$) and cyclobutano-(3',4':6$\beta$,7$\beta$) compounds of Formula III.

Alternatively, the 6$\alpha$,7$\alpha$-cyclobutano adduct or the 6$\beta$,7$\beta$-cyclobutano adduct of Formula II can each be separately carried through the hydrolysis procedure to afford the corresponding 6$\alpha$,7$\alpha$- and 6$\beta$,7$\beta$-isomer containing free carboxylic acid groups at the C–1' and C–2' positions of the cyclobutano moiety.

The 1',2' - dicarboxycyclobutano - (3',4':6$\alpha$,7$\alpha$) compounds and the corresponding 6$\beta$,7$\beta$-isomers of Formula III are each separately converted by an oxidative decarboxylation reaction with an oxidizing agent such as with lead tetraacetate, thallium triacetate, and the like, in an inert organic solvent such as dioxane, benzene, tetrahydrofuran, diethyleneglycol dimethylether, or the like, or by an electrochemical oxidation reaction at the anode of an electrolytic cell to form the corresponding 1'-cyclobuteno-(3',4':6,7) compound of Formula IV. In the practice of the conversion (III→IV), if a free hydroxy group is present at the 17$\beta$-position, it is converted to a 17$\beta$-acyloxy derivative by a conventional technique prior to the oxidative decarboxylation reaction and regenerated subsequently. For example, the free hydroxy compound is esterified by treatment with a hydrocarbon carboxylic acid anhydride such as acetic anhydride and the like, in pyridine at room temperature for about 24 hours. Subsequent to the oxidative decarboxylation reaction, if desired, the free hydroxy group can be reformed by conventional hydrolysis of the acyloxy group such as with potassium hydroxide in methanol.

The novel 1',2',-dicarboalkoxycyclobutano-(3',4':6,7)

derivatives of Formula V are obtained from the 1',2'-dicarbonyloxycyclobutano-(3',4':6,7) derivatives of Formula II or the 1',2'-dicarboxycyclobutano-(3',4':6,7) derivatives of Formula III by an esterification procedure such as by refluxing a compound of Formula II or III in an excess of an alcohol containing less than 8 carbon atoms and in the presence of a strong acid such as sulfuric acid, p-toluenesulfonic acid, and the like. The preferred choice of acid is p-toluenesulfonic acid.

In the practice of these conversions, i.e. (II→V) and (III→V), either a mixture of the 4,5- and 6,7-cyclobutano adducts or the individual 6α,7α- and 6β,7β-cyclobutano adducts thereof can be employed for the preparation of diesters of Formula V. For these cases wherein a mixture is used, the final diester products of Formula V are separated by a conventional technique such as column chromatography as described hereinabove. In the practice of these conversions, any acyloxy group present at the 17β-position will be hydrolyzed to the free hydroxy group. The free hydroxy group can be esterified subsequently, if desired, e.g., by treatment with a hydrocarbon carboxylic acid anhydride in pyridine and the like. In addition, a 17β-(tetrahydropyran-2'-yloxy) group in a compound of Formulas II and III will be hydrolyzed in the course of the conversion to a compound of Formula V which can be reformed subsequently, if desired, by treatment with dihydropyran in the presence of p-toluenesulfonic acid in benzene and the like.

In the practice of the above outlined sequence, the starting material of Formula I can contain a free hydroxy group at the C–17 position which can be further elaborated by conventional techniques after the completion of the photochemical cycloaddition reaction. Thus, for example, a 17β-hydroxy group is treated with dihydropyran and an acid catalyst such as p-toluenesulfonic acid, either alone or in a cosolvent such as benzene or with a hydrocarbon carboxylic acid anhydride in pyridine and an inert solvent such as benzene to yield a corresponding 17β-(tetrahydropyran-2'-yloxy) or 17β-acyloxy substituent, respectively.

The 1'-cyclobuteno-(3',4':6α,7α) compounds of Formula IV and the 6β,7β-isomers thereof, in addition to having valuable pharmacological activity, are useful as intermediates for the preparation of a cyclobutano-(3',4':6,7) compound of Formula VII:

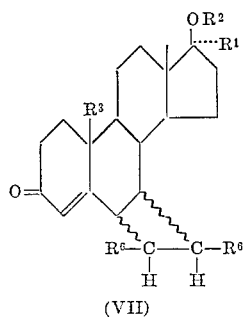

(VII)

wherein all substituents are as defined hereinabove. To obtain a compound of Formula VII, a 1'-cyclobuteno compound of Formula IV is catalytically hydrogenated, for example, with a Wilkinson catalyst, i.e., tris-triphenylphosphine rhodium chloride in a mixture of ethyl acetate:ethanol as the solvent, for a time sufficient to consume the theoretical amount of hydrogen. The compounds of Formula VII wherein $R^1$ is hydrogen, lower alkyl or lower alkenyl, are valuable anabolic/androgenic agents. The compounds of Formula VII wherein $R^1$ is lower alkenyl, lower alkynyl or lower haloalkynyl are useful in the treatment of various menstrual disorders, the control and regulation of fertility and for suppressing the output of the pituitary gland.

The $\Delta^{4,6}$-diene starting materials of Formula I are conveniently prepared by treating the corresponding 3-keto-$\Delta^4$-ene with chloranil in a solvent such as t-butanol, xylene, and the like, at reflux for a period of about 1 to 12 hours.

The following examples are set forth to illustrate but are not intended to limit the scope of the present invention.

EXAMPLE 1

A mixture of 2 g. of 17β-hydroxyandrosta-4,6-dien-3-one and 0.8 g. of maleic anhydride in 140 ml. of benzene in a Pyrex container is irradiated with a 200 watt high pressure mercury vapor lamp at room temperature for a period of three hours. At the end of the reaction time, which is followed by the U.V. spectra, the reaction mixture is evaporated to dryness to furnish a residue containing the 4α,5α-maleic anhydride adduct, the 6α,7α-maleic anhydride adduct and the 6β,7β-maleic anhydride adduct. One gram of the residue is separated by fractional crystallization employing ether:benzene to yield 1',2'-dicarbonyloxycyclobutano - (3',4':4α,5α) - 17β - hydroxyandrost-4-en-3-one; 1',2' - dicarbonyloxycyclobutano-(3',4':6α,7α)-17β-hydroxyandrost-4-en-3-one, and 1',2'-dicarbonyloxycyclobutano-(3',4':6β,7β)-17β - hydroxyandrost-4-en-3-one.

One gram of the residue containing the mixture of adducts, prepared by the above procedure, is allowed to stand at room temperature for three hours with 1 g. of sodium bicarbonate and 10 ml. of water and 90 ml. of dioxane. At the end of the reaction time, the reaction mixture is acidified with aqueous hydrochloric acid and the mixture is evaporated under reduced pressure. The resulting residue is partitioned between ethyl acetate and water and the ethyl acetate phase is separated, dried, and the ethyl acetate removed under reduced pressure to yield a crude mixture of diacids. This crude mixture is chromatographed on a silica gel eluting with ethyl acetate:hexane containing 0.5% by volume of 98% formic acid to yield 1',2' - dicarboxycyclobutano-(3',4':4α,5α)-17β-hydroxyandrost-4-en-3-one; 1',2' - dicarboxycyclobutano-(3',4':6α,7α)-17β-hydroxyandrost-4-en-3-one, and 1',2'-dicarboxycyclobutano - (3',4':6β,7β) - 17β - hydroxyandrost-4-en-3-one, each of which is recrystallized separately from methanol:ether.

Utilizing the above procedure, the following starting materials, namely,

17β-acetoxyandrosta-4,6-dien-3-one;
17β-tetrahydropyran-2'-yloxyandrosta-4,6-dien-3-one;
17α-methyl-17β-hydroxyandrosta-4,6-dien-3-one;
17α-ethyl-17β-hydroxyandrosta-4,6-dien-3-one;
17α-ethynyl-17β-hydroxyandrosta-4,6-dien-3-one;
17α-methyl-17β-hydroxy-19-norandrosta-4,6-dien-3-one;
17α-ethyl-17β-hydroxy-19-norandrosta-4,6-dien-3-one;
17β-hydroxy-19-norandrosta-4,6-dien-3-one;

to the 1',2'-dicarboxycyclobutano-(3',4':6α,7α) and 1',2'-dicarboxycyclobutano-(3',4':6β,7β) compounds, namely 1',2'-dicarboxycyclobutano-(3',4':6α,7α)-17β-acetoxyandrost-4-en-3-one; and the 6β,7β-isomer;
1',2'-dicarboxycyclobutano-(3',4':6α,7α)-17β-tetrahydropyran-2'-yloxyandrost-4-en-3-one; and the 6β,7β-isomer;
1',2'-dicarboxycyclobutano-(3',4':6α,7α)-17α-methyl-17β-hydroxyandrost-4-en-3-one, and the 6β,7β-isomer;
1',2'-dicarboxycyclobutano-(3',4':6α,7α)-17α-ethyl-17β-hydroxyandrost-4-en-3-one, and the 6β,7β-isomer;
1',2'-dicarboxycyclobutano-(3',4':6α,7α)-17α-ethynyl-17β-hydroxyandrost-4-en-3-one, and the 6β,7β-isomer;
1',2'-dicarboxycyclobutano-(3',4':6α,7α)-17α-methyl-17β-hydroxy-19-norandrost-4-en-3-one, and the 6β,7β-isomer;
1',2'-dicarboxycyclobutano-(3',4':6α,7α)-17α-ethyl-17β-hydroxy-19-norandrost-4-en-3-one, and the 6β,7β-isomer;
1',2'-dicarboxycyclobutano-(3',4':6α,7α)-17β-hydroxy- 19-norandrost-4-en-3-one, and the 6β,7β-isomer, respectively.

EXAMPLE 2

Utilizing the procedure of Example 1 with the exception of substituting the following anhydrides, namely dimethylmaleic anhydride and then difluoromaleic anhydride in place of maleic anhydride, the Δ$^{4,6}$-3-keto starting material of Example 1 are converted to the corresponding 1',2' - dimethyl-1',2'-dicarboxycyclobutano-(3',4':6α,7α) compounds and the 6β,7β-isomers, thereof and the corresponding 1',2'-difluoro-1',2'-dicarboxycyclobutano-(3',4':6α,7α) compounds and the 6β,7β-isomers, thereof respectively.

Among those obtained are the following specific compounds:

1',2' - dimethyl-1',2'-dicarboxycyclobutano-(3',4':6α,7α)-17α-methyl - 17β - hydroxyandrost-4-en-3-one, and the 6β,7β-isomer;
1',2'-difluoro - 1',2' - dicarboxycyclobutano-(3',4':6α,7α)-17α - ethynl - 17α - hydroxy-19-norandrost-4-en-3-one, and the 6β,7β-isomer;
1',2' - dimethyl-1',2'-dicarboxycyclobutano-(3',4':6α,7α)-17β-hydroxyandrost-4-en-3-one, and the 6β,7β-isomer.

EXAMPLE 3

A mixture of 1 g. of 1',2'-dicarboxycyclobutano-(3',4':6α,7α)-17β-hydroxyandrost-4-en-3-one, 1 g. of p-toluenesulfonic acid monohydrate and 25 ml. of acetic anhydride is allowed to stand at room temperature for one hour and then poured into ice water and stirred. This mixture is then extracted several times with ethyl acetate and the ethyl acetate extracts are dried and evaporated to dryness to yield 1',2'-dicarboxycyclobutano-(3',4':6α,7α)-17β-acetoxyandrost-4-en-3-one.

A mixture of 1 g. of 1',2'-dicarboxycyclobutano-(3',4':6α,7α)-17β-acetoxyandrost-4-en-3-one and 5 g. of lead tetraacetate in 20 ml. of dioxane is heated at 90° C. under nitrogen for 45 minutes. The dioxane is removed under reduced pressure, and the residue is partitioned between ethyl acetate and 2 N hydrochloric acid. The organic phase is separated and washed with water, dried and evaporated to yield 1'-cyclobuteno - (3',4':6α,7α) - 17β-acetoxyandrost-4-en-3-one.

A solution of 1 g. of 1'-cyclobuteno-(3',4':6α,7α)-17β-acetoxyandrost-4-en-3-one in 60 ml. of methanol is heated at reflux for one hour with a solution of 1 g. of potassium carbonate in 6 ml. of water. The reaction mixture is then poured into ice water and the solid which forms is collected by filtration, washed with water to neutrality and dried to yield 1'-cyclobuteno-(3',4':6α,7α)-17β-hydroxyandrost-4-en-3-one which is recrystallized from methylene chloride:ether.

By repeating the above procedure and using as the starting material the corresponding 6β,7β-isomer, there is obtained the corresponding 1'-cyclobuteno-(3',4':6β,7β)-17β-hydroxyandrost-4-en-3-one.

Utilizing the above procedure, the 1',2'-dicarboxycyclobutano - (3',4':6α,7α)-17β-hydroxy compounds and then the 6β,7β-isomers thereof of Examples 1 and 2 are converted to the corresponding 1'-cyclobuteno-(3',4':6α,7α)-17β-hydroxy compounds and the corresponding 1'-cyclobuteno-(3'4':6β,7β)-17β-hydroxy compound respectively; among which are the following specific derivatives:

1'cyclobuteno - (3',4':6α,7α)-17β-hydroxy-19-norandrost-4-en-3-one, and the 6β,7β-isomer;
1-cyclobuteno - (3',4':6α,7α) - 17α-methyl-17β-hydroxyandrost-4-en-3-one, and the 6β,7β-isomer;
1' - cyclobuteno - (3',4':6α,7α)-17α-ethyl-17β-hydroxyandrost-4-en-3-one, and the 6β,7β-isomer;
1' - cyclobuteno - (3',4':6α7α)-17α-ethynyl-17β-hydroxyandrost-4-en-3-one, and the 6β,7β-isomer;
1' - cyclobuteno - (3',4':6α,7α)-17α-methyl-17β-hydroxy-19-norandrost-4-en-3-one, and the 6β,7β-isomer;
1' - cyclobuteno - (3',4':6α7α)-17α-ethyl-17β-hydroxy-19-norandrost-4-en-3-one, and the 6β,7β-isomer;
1',2'-dimethyl - 1' - cyclobuteno-(3',4':6α,7α)-17α-methyl-17β-hydroxyandrost-4-en-3-one, and the 6β,7β-isomer;
7',2 - difluoro - 1'-cyclobuteno-(3',4':6α,7α)-17α-ethynyl-17β-hydroxy-19-norandrost-4-en-3-one, and the 6β,7β-isomer; and
1',2' - dimethtyl - 1' - cyclobuteno-(3',4':6α,7α)-17β-hydroxyandrost-4-en-3-one, and the 6β,7β-isomer.

EXAMPLE 4

A solution of 1 g. of 1',2'-dicarbonyloxycyclobutano-(3',4':6α,7α)-17β-acetoxyandrost-4-en-3-one in 50 ml. of ethanol containing 0.5 g. of p-toluenesulfonic acid is held at reflux for 24 hours. At the end of the reaction, the pH of the solution is adjusted to neutral by the addition of base. The organic phase is evaporated to dryness under reduced pressure to yield 1',2'-dicarboethoxycyclobutano-(3',4':6α,7α)-17β-hydroxyandrost-4-en-3-one which may be further purified by recrystallization from acetone: ether.

By repeating the above procedure with the 6β,7β-isomer, there is obtained the corresponding 1',2'-dicarboethoxycyclobutano - (3',4':6β,7β)-17β-hydroxyandrost-4-en-3-one.

Utilizing the same procedure but substituting other alcohols for ethanol, such as methanol, n-amyl alcohol, isopropanol, n-hexanol, there are obtained the corresponding 1',2'-dicarbomethoxy-, 1',2'-dicarboamyloxy-, 1',2'-dicarboisopropoxy-, 1',2'-dicarbohexyloxy- derivatives of cyclobutano-(3',4':6α,7α)-17β-hydroxyandrost-4-en-3-one and the 6β,7β-isomers, thereof.

EXAMPLE 5

To a mixture of 100 ml. of ethyl acetate and 100 ml. of ethanol is added 2 g. of tris-triphenylphosphine rhodium chloride catalyst. The mixture, at room temperature, is then flushed with nitrogen followed by flushing with hydrogen. A solution of 2.0 g. of 1'-cyclobuteno-(3',4':6β,7β)-17β-hydroxyandrost-4-en-3-one in 50 ml. of ethyl acetate:ethanol (1:1) is then added. This mixture is then agitated in the hydrogen atmosphere at room temperature for about 30 minutes. The catalyst is removed by filtration through silica gel and the filtrate is evaporated to dryness to yield cyclobutano-(3',4':6β,7β)-17β-hydroxyandrost-4-en-3-one which is further purified by recrystallization from acetone:hexane.

By using a similar procedure, the corresponding 6α,7α-isomer is converted to the corresponding cyclobutano-3', 4':6α,7α)-17β-hydroxyandrost-4-en-3-one.

Utilizing a similar procedure the 1'-cyclobuteno-(3',4': 6α,7α) compounds and then the 6β,7β-isomers thereof of Example 3 are each separately converted to the corresponding cyclobutano-(3',4':6α,7α) compounds and the corresponding cyclobutano-(3',4':6β,7β) compounds, respectively.

EXAMPLE 6

Two milliliters of dihydropyran are added to a solution of 1 g. of 1'-cyclobuteno-(3',4':6α,7α)-17β-hydroxy-19-norandrost-4-en-3-one in 15 ml. of benzene. About 1 ml. is removed by distillation to remove moisture and 0.4 g. of p-toluenesulfonic acid is added to the cooled solution. This mixture is allowed to stand at room temperature for four days, and is then washed with aqueous sodium carbonate solution and water, dried and evaporated. The residue is chromatographed on neutral alumina, eluting with hexane, to yield 1'-cyclobuteno-(3',4':6α,7α)-17β-(tetrahydropyran - 2' - yloxy)-19-norandrost-4-en-3-one which is recrystallized from ether:pentane.

By repeating the above procedure with the 6β,7β-isomer, there is obtained the corresponding 1'-cyclobuteno- (3',4':6β,7β) - 17β-tetrahydropyran - 2' - yloxy-19-norandrost-4-en-3-one.

Utilizing the above procedure, other novel cyclobuteno and cyclobutano 17β-hydroxy compounds such as those, e.g., of Examples 1, 2, and 3 are converted to the corresponding cyclobuteno and cyclobutano-17β-(tetrahydropan-2'-yloxy) compounds among which are the following specific compounds:

1',2' - cyclobuteno - (3',4':6α,7α)-17β-(tetrahydropyran-2'-yloxy)-androst-4-en-3-one, and the 6β,7β-isomer; and 1',2' - difluorocyclobutano - (3',4':6α,7α) - 17α-ethynyl-17β - (tetrahydropyran-2'-yloxy)-19-norandrost-4-en-3-one, and the 6β,7β-isomer.

EXAMPLE 7

A mixture of 1 g. of 1'-cyclobuteno-(3,4':6α,7α)-17β-hydroxy-19-norandrost-4-en-3-one, 4 ml. of pyridine and 2 ml. of acetic anhydride is allowed to stand at room temperature for 15 hours. The mixture is then poured into ice water and the solid which forms is collected by filtration, washed with water and dried to yield 1'-cyclobuteno - (3',4':6α,7α)-17β-acetoxy-19-norandrost-4-en-3-one which is further purified through recrystallization from acetone:hexane.

Utilizing the above procedure, with the exception of substituting first propionic anhydride, second caproic anhydride, third enanthic anhydride and then cyclopentylpropionic anhydride for acetic anhydride, there are obtained the corresponding 17β-propionate, 17β-caproate, 17β - enanthate, and 17β-cyclopentylpropionate, respectively of 1' - cyclobuteno - (3',4':6α,7α)-17β-hydroxy-19-norandrost-4-en-3-one.

By repeating the above procedure with the 6β,7β-isomer, there are obtained the corresponding 6β,7β-final products.

EXAMPLE 8

Into the anode compartment of an electrolysis cell provided with smooth platinum electrodes (each electrode measuring about 1 cm. x 3 cm. x 1.6 mm.) there is added 0.4 g. of 1',2'-dicarboxycyclobutano-(3',4:6α,7α)-17α-methyl-17β-acetoxyandrost-4-en-3-one in a mixture of 10 ml. of water, 40 ml. of pyridine and 1 ml. of triethylamine. A current density of 0.03 amp/cm.$^2$ is then applied for 24 hours while holding the reaction mixture in the anode compartment at reflux and under an atmosphere of nitrogen. Thereafter, the current is shut off and the reaction mixture is removed from the cell. The reaction mixture is concentrated under vacuum to a small volume which is then extracted with diethyl ether. The resulting diethyl ether phase is washed with 1 N hydrochloric acid, aqueous sodium bicarbonate and then washed, dried and evaporated to dryness to yield 1'-cyclobuteno - (3',4':6α,7α) - 17α - methyl - 17β - acetoxyandrost-4-en-3-one.

By repeating the above procedure, with the 6β,7β-isomer, there is obtained the corresponding 1'-cyclobuteno-(3',4':6β,7β) - 17α - methyl - 17β - acetoxyandrost - 4 - en-3-one.

By repeating the above procedure, the 1',2'-dicarboxycyclobutano-(3',4':6α,7α)- and then the 6β,7β-isomers thereof of Examples 1 and 2 are each separately converted to the corresponding 1'-cyclobuteno-(3',4':6α,7α) and 6β,7β-isomers thereof.

By repeating the above procedure with the exception of substituting first methanol and then dioxane for pyridine in the electrochemical medium, the above starting materials are each separately oxidized to the corresponding 1' - cyclobuteno - (3',4':6α,7α)- and 6β,7β - isomers thereof.

What is claimed is:
1. A compound selected from those of the formulas:

(A)    and    (B)

wherein
R$^1$ is hydrogen, lower alkyl, lower alkenyl, lower alkynyl or lower haloalkynyl;
R$^2$ is hydrogen, tetrahydropyran-2'-yl, or a hydrocarbon carboxylic acyl group of less than 12 carbon atoms;
R$^3$ is hydrogen or methyl;
R$^4$ and R$^5$ are each hydroxy or lower alkoxy or together is oxy; and
R$^6$ is hydrogen, methyl or fluoro.

2. A compound according to Formula A of claim 1 wherein R$^1$ is hydrogen, methyl, ethyl or ethynyl; R$^2$ is hydrogen, tetrahydropyran-2'-yl or acetyl; R$^4$ and R$^5$ together is oxy; R$^6$ is hydrogen.

3. A compound according to Formula B of claim 1 wherein R$^1$ is hydrogen, methyl, ethyl or ethynyl; R$^2$ is hydrogen, tetrahydropyran-2'-yl or acetyl; and R$^6$ is hydrogen.

4. A compound according to claim 3 wherein each of R$^1$, R$^2$ and R$^3$ is hydrogen.

5. A compound according to claim 3 wherein each of R$^1$ and R$^2$ is hydrogen and R$^3$ is methyl.

6. A compound according to claim 3 wherein each of R$^1$ and R$^3$ is hydrogen and R$^2$ is tetrahydropyran-2'-yl.

7. A compound according to claim 3 wherein R$^1$ is ethynyl; each of R$^2$ and R$^3$ is hydrogen.

8. A compound according to claim 3 wherein R$^1$ is ethynyl; R$^2$ is hydrogen, and R$^3$ is methyl.

9. A compound according to claim 3 wherein R$^1$ is methyl; and each of R$^2$ and R$^3$ is hydrogen.

10. A compound according to claim 3 wherein R$^1$ is methyl; R$^2$ is hydrogen, and R$^3$ is methyl.

11. A compound according to claim 3 wherein R$^1$ is hydrogen; R$^2$ is tetrahydropyran-2'-yl; and R$^3$ is methyl.

12. A process which comprises the steps of (1) adding photochemically, in an inert solvent and under ultraviolet irradiation, an anhydride selected from the group maleic anhydride, dimethylmaleic anhydride and difluoromaleic anhydride to a 3-keto-Δ$^{4,6}$-diene of the androstane or 19-nor androstane series to obtain the corresponding 1',2'-dicarbonyloxycyclobutano-(3',4':6,7) derivative; (2) hydrolyzing under basic conditions said 1',2'-dicarbonyloxycyclobutano-(3',4':6,7) derivative and then acidifying to obtain the corresponding 1',2'-dicarboxycyclobutano-(3',4':6,7) derivative; and (3) oxidatively decarboxylation said 1',2'-dicarboxycyclobutano-(3',4':6,7) derivative with an oxidizing agent selected from the group lead tetraacetate and thallium triacetate or by an electrochemical oxidation in an electrolytic cell to obtain a 1'-cyclobuteno-(3',4':6,7) derivative.

13. A process according to claim 12 wherein in step (3) said oxidative decarboxylation is carried out by treatment with lead tetraacetate.

14. A process according to claim 12 wherein in step (3) said electrochemical oxidation is conducted at a platinum electrode in an electrochemical medium comprising a tertiary amine electrolyte and water either alone or in combination with a water miscible, inert organic solvent at a current density of about 0.01 to about 0.05 ampere per cm.$^2$, said tertiary amine being selected from the group consisting of pyridine, triethylamine and mixtures thereof.

15. A process according to claim 12 wherein said 1'-cyclobuteno-(3',4':6,7) derivative is catalytically hydrogenated with tris-triphenylphosphine rhodium chloride catalyst to the corresponding cyclobutano-(3',4':6,7) derivative.

No references cited.

HENRY A. FRENCH, Primary Examiner

U.S. Cl. X.R.

260—397.1, 397.4, 999; 204—158